(12) United States Patent
Schmid

(10) Patent No.: US 6,515,397 B1
(45) Date of Patent: Feb. 4, 2003

(54) ELECTRIC MOTOR

(76) Inventor: Egon Schmid, Sauldorfer Strasse 1, D-88605 Sauldorf (DE)

( * ) Notice: Subject to any disclaimer, the term of this patent is extended or adjusted under 35 U.S.C. 154(b) by 0 days.

(21) Appl. No.: 09/486,514

(22) PCT Filed: Aug. 28, 1998

(86) PCT No.: PCT/EP98/05457

§ 371 (c)(1),
(2), (4) Date: May 18, 2000

(87) PCT Pub. No.: WO99/12246

PCT Pub. Date: Mar. 11, 1999

(30) Foreign Application Priority Data

Aug. 29, 1997 (DE) .......................... 197 37 752

(51) Int. Cl.⁷ .............................. H02K 1/18; H02K 1/14
(52) U.S. Cl. ........................ 310/217; 29/596; 310/258
(58) Field of Search ................................ 310/216, 217, 310/218, 254, 179, 184, 258; 29/596

(56) References Cited

U.S. PATENT DOCUMENTS

| | | | | |
|---|---|---|---|---|
| 4,246,505 A | * | 1/1981 | Yasaka et al. | 310/218 |
| 4,276,490 A | * | 6/1981 | Saldinger | 310/184 |
| 5,834,866 A | * | 11/1998 | Fujitani et al. | 310/49 R |
| 5,894,654 A | * | 4/1999 | Varis et al. | 29/596 |

FOREIGN PATENT DOCUMENTS

| | | | | |
|---|---|---|---|---|
| DE | 44 36 257 | * | 4/1996 | H02K/1/28 |
| EP | 0 500 457 A1 | * | 8/1992 | H02K/1/06 |
| GB | 2310545 | * | 8/1997 | 310/218 |
| JP | 7-298522 | * | 11/1995 | H02K/1/14 |
| JP | 2000-197319 | * | 7/2000 | H02K/1/14 |
| JP | 2000-209795 | * | 7/2000 | H02K/1/18 |
| JP | 2000-209796 | * | 7/2000 | H02K/15/02 |

* cited by examiner

Primary Examiner—Karl Tamai
(74) Attorney, Agent, or Firm—Bachman & LaPointe, P.C.

(57) ABSTRACT

The invention relates to an electric motor comprising a stator and a rotor. The stator and/or rotor comprise winding carriers (2, 2.1) with a respective winding (5) and at least two respective terminal connections. The two adjacent winding carriers (2, 2.1) are joined to each other or to the stator and/or rotor by means of a common fixing element (15).

8 Claims, 2 Drawing Sheets

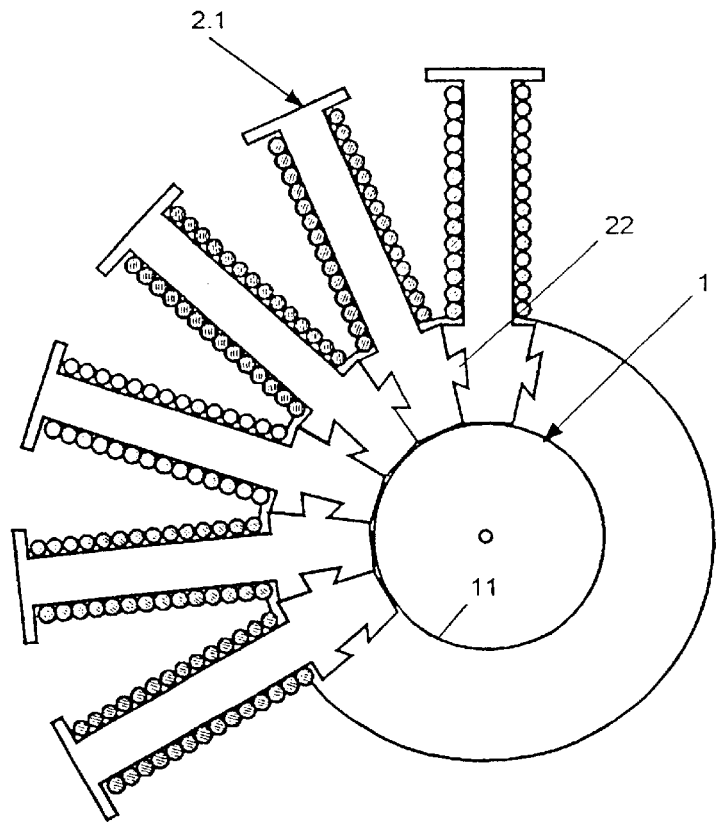
Fig. 5
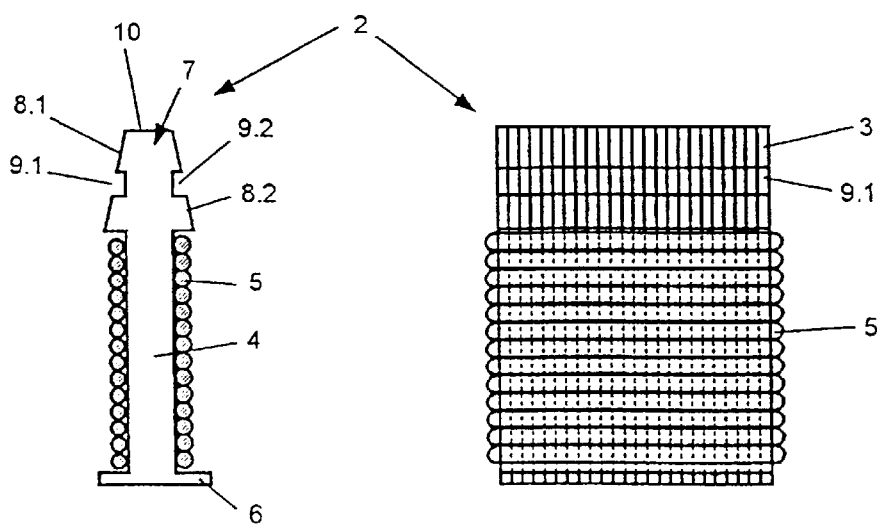
Fig. 3                    Fig. 4

ELECTRIC MOTOR

BACKGROUND OF THE INVENTION

The invention relates to an electric motor having a stator and a rotor, the stator and/or rotor having winding carriers of a winding having at least two terminals, the winding carriers being connected individually to the stator and/or rotor in a detachable manner.

Electric motors or generators are one of the most important electrical machines. They are used in the most diverse forms and in many different areas of everyday life. An essential feature of the electric motor is that it converts electrical energy into mechanical work. In this case, it is usually constructed as a rotating machine, a rotor rotating about a stator. The rotor may be the actual armature, or else, in particular in wheel-hub motors, the rotor may be the outer exciter part, which surrounds the armature part and is then connected, for example, to a rim or the like.

The manufacture of commercially available motors involves some difficulties. The exciter part and/or the armature part have carriers, slots or the like around which or in which windings are placed. In most cases, this is done by hand.

In WO96/23344, for example, a manufacturing process for a motor is shown in which it is already possible to wind the winding carriers automatically. To this end, the winding carriers are wound before they are connected to the stator and/or rotor. They are then inserted into axially parallel slots and are secured there.

DE 36 38 228 A1 describes an electric motor (external-rotor salient-pole motor) with a stator and a rotor, the stator having winding carriers with in each case a winding having at least two terminals. These adjacent winding carriers are each connected separately to the stator.

GB-A 2 310 545 discloses an electric motor in which adjacent winding carriers are connected to one another at their outer circumference.

Furthermore, there are difficulties in securing the winding carriers to the stator and/or rotor and in particular also with the electrical connection of the individual windings, the winding carrier being oriented as north or south pole by this electrical connection.

DE 829 613 C discloses an electric motor of the aforesaid type. This electric motor is designed in such a way that two adjacent winding carriers are inserted into a dovetail slot of a yoke body and are restrained there by wedge-like parts.

The object of the present invention is to further simplify the manufacture of an electric motor to a considerable extent and reduce power losses in the process.

SUMMARY OF THE INVENTION

The foregoing object is achieved in that a plate, a ring or the like which encloses an angle of less than 90° with the stator and/or rotor projects from the stator and/or rotor, a fastening element pressing the winding carriers with their root region into this angle.

The configuration of the winding carriers has the advantage that the motor is manufactured virtually according to the modular construction principle. It can easily be assembled and easily be dismantled again. The winding carriers are wound before the assembly, so that there is nothing to prevent automatic winding.

A root region of the winding carrier is in particular suitable for connecting the winding carriers to one another or for connecting the winding carriers by means of a common fastening element. For example, if a stator is located as armature core in the center of the motor, the winding carriers can be arranged to protrude radially from this armature core. In this case, their root regions preferably abut against one another and are either connected to one another or are secured via a common fastening element.

If, for example, screw bolts are used as fastening elements and these are tightened, the winding carriers or their root regions are pressed into the angle between armature core and plate, so that the winding carrier bears effectively against the armature core.

The screw bolt engages in a tapped hole in a plate which is assigned to the armature core. This plate forms a projecting ring, so that the winding carriers sit on this plate.

For the sake of simplicity, the connection by means of a common fastening element is effected by slots being formed laterally in the root region of the winding carrier, in which case two slots of adjacent winding carriers together form a locating bore for a screw bolt for example. For this reason, the side flanks of the root region are preferably designed so as to run conically to one another, in which case they preferably run radially in the direction of a center of the armature core.

Furthermore, the slots also have the advantage during winding that clamping claws which hold the winding carrier in place during the winding can engage in these slots. As a result, the winding is also substantially facilitated.

In another exemplary embodiment of the invention, a positive-locking connection between the winding carriers is also intended. This may be done, for example, by a slot/key connection of dovetail design.

To secure the winding carriers to the armature core, plates which overlap the root region of the winding carriers may be screwed on, for example, on both sides.

It is also conceivable for each individual winding carrier to be connected separately to the rotor and/or stator. In one exemplary embodiment, a fastening element, for example a screw, which passes through the root region of the winding carrier, is sufficient for this purpose.

However, the present invention directs particular attention toward the securing of the lugs of the winding. The intention is for the windings to be always wound onto the winding carrier in the same direction, so that no importance has to be attached to a subsequent north or south orientation during the winding of the winding carrier. The orientation of the winding carrier is selected after the winding carriers have been put onto the stator or rotor, a printed board which has two separate strip conductors being assigned to the winding carriers. One strip conductor is connected to a positive pole, and the other strip conductor is connected to a negative pole. The two terminal lugs project from each winding carrier, the one or the other lug being connected to the one or the other pole depending on the desired orientation of the winding carrier. This is done in a simple manner by virtue of the fact that the lug is pushed through the printed board and soldered to the appropriate strip conductor. This may be done in a common solder bath after the lugs of all the winding carriers have been pushed through.

In addition, further components for control of the motor may be arranged on the printed board. In the case of powerful motors, the printed boards may also be stacked or have a multilayer construction. Many possibilities which are to be covered by the present invention are likewise conceivable here.

The winding carriers preferably consist of individual stacked laminations. According to the invention, precision machining of these winding carriers is to take place after the stacking, the side faces in particular being machined. This results in a further mechanical connection of the individual laminations, which leads to an improvement in the magnetic property. Furthermore, the magnetic property of the winding carrier may also be favorably influenced by the selection of the thickness of the laminations.

BRIEF DESCRIPTION OF THE DRAWINGS

Further advantages, features and details of the invention follow from the description below of preferred exemplary embodiments and with reference to the drawing, in which:

FIG. 3 shows a plan view of a winding carrier according to the invention;

FIG. 4 shows a side view of the winding carrier according to FIG. 3;

FIG. 5 shows a plan view of a further part of an exemplary embodiment of a motor according to the invention.

DETAILED DESCRIPTION OF PREFERRED EMBODIMENT(S)

Figure 1:
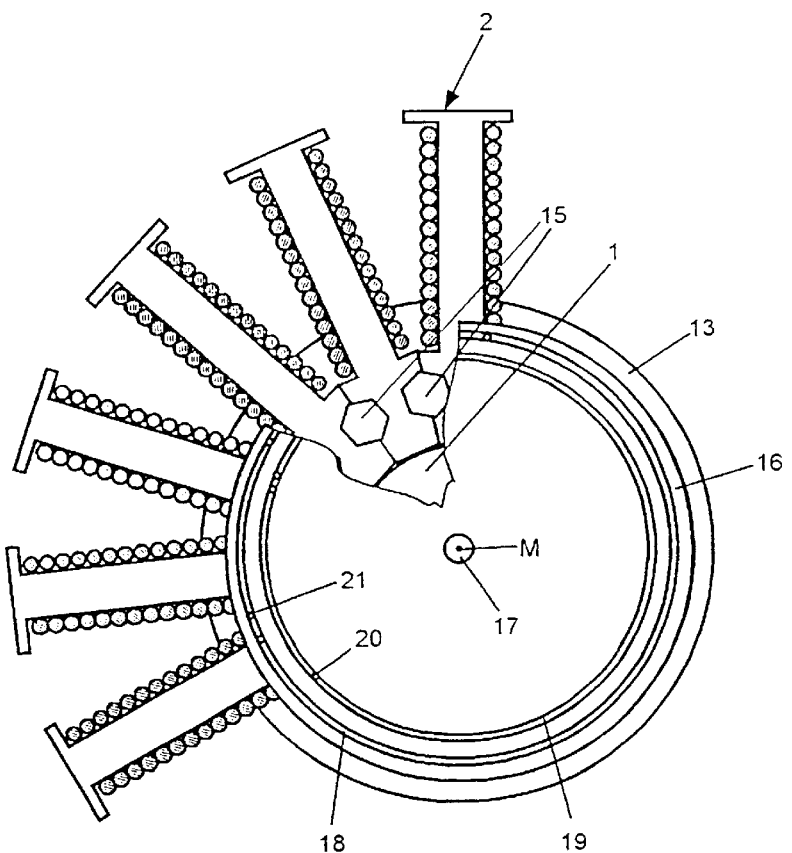
FIG. 1 shows a plan view of a part of an electric motor according to the invention.
Figure 2:
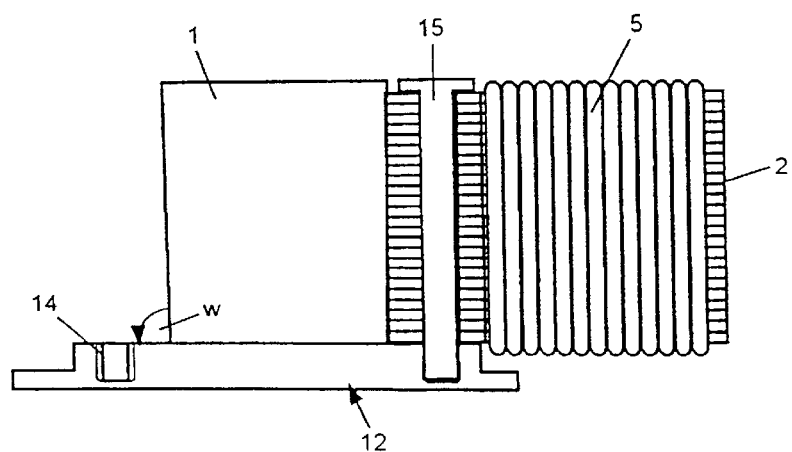
FIG. 2 shows a side view of a part of an electric motor in accordance with FIG. 1.

According to FIGS. 1 and 2, of an electric motor according to the invention, an armature core 1 is shown as part of a stator. This armature core 1 is of roughly cylindrical design and has a plurality of winding carriers 2.

According to FIGS. 3 and 4, each winding carrier 2 is preferably formed from a plurality of stacked laminations 3. The winding carrier 2 has a basic body 4 which is covered by a winding 5. Adjoining the end of the winding carrier 2 is a crosspiece 6 which prevents the winding 5 from sliding off the basic body 4.

At the other end of the crosspiece 6, a root region 7, which is of roughly conical shape in cross section, is integrally formed on the basic body 4, the two side flanks 8.1 and 8.2 running approximately radially toward a center M of the armature core 1. A slot 9.1 or 9.2 respectively is in each case formed in the side flanks 8.1 and 8.2. An end face 10 of the root region 7 may be formed slightly curved in accordance with a circular arc 11 of the cylindrical armature core 1.

According to FIG. 2, a plate 12 is attached to the armature core 1 and projects laterally beyond the armature core 1. As a result, a laterally projecting ring 13 is formed, in which tapped holes 14 are formed at regular distances apart. Furthermore, the plate 12 forms an angle w of less than 90° with the armature core 1.

This part of the electric motor according to the invention is assembled as follows:

In a first operation, the laminations 3 of the winding carrier 2 are stacked one on top of the other and are preferably packed in a stamped form or are connected to one another, for example, by laser welding. This stacked winding carrier is then precision machined, as a result of which the magnetic properties are considerably improved. In particular, distances between the laminations, which result from lateral burrs for example, are removed by the precision machining.

The basic body 4 of the winding carrier 2 is now wound, the winding always being effected in the same direction. Therefore no allowance need be made for a north or south orientation of the winding carrier 2.

The appropriate number of winding carriers 2 is now put onto the plate 12, the slots 9.1 and 9.2 respectively being located in the region of the tapped holes 14. The end face 10 bears against the armature core 1, while the side flanks 8.1 and 8.2 respectively of adjacent winding carriers 2 bear against one another.

The winding carriers 2 are secured relative to the armature core 1 or the plate 12 by screw bolts 15, which also engage in the tapped hole 14. When the screw bolts 15 are tightened, the root region 7 of the winding carrier is pressed against the armature core 1 as a result of the angle w of less than 90°, so that the winding carrier 2 is effectively fixed.

Projecting upward from the individual winding carriers 2 are terminal lugs, which, depending on the orientation of the winding carrier as a north or south pole, are to be connected to a positive or negative pole respectively. This is effected via a printed board 16, which is secured to the armature core 1 by a screw 17 and has two circular strip conductors 18 and 19, which in each case have a connection to a respective positive or negative pole. The responding terminal lugs 20 and 21 respectively of the windings 5 only need to be pushed through the printed board 16 and brought into contact with the strip conductors 18 and 19 respectively. This is done alternately, for example at adjacent winding carriers, in such a way that in each case a winding carrier which is designed as a south pole is arranged adjacent to a winding carrier designed as a north pole.

In FIG. 5, instead of a connection of two adjacent winding carriers 2.1, a positive-locking connection which consists of a slot/key connection 22 is shown. The winding carriers 2.1 can be fitted together in this way, in which case, if need be, an additional screwed connection in accordance with FIG. 1 is possible at least at one point in order to secure such a ring of winding carriers 2.1.

What is claimed is:

1. An electric motor comprising a rotor and a stator, one of the rotor and the stator having winding carriers, wherein each of the winding carriers has a winding having at least two terminals, each of the winding carriers includes a root region for connecting each winding carrier separately to the one of the rotor and the stator, a plate connected to the one of the rotor and the stator wherein the plate encloses an angle (w) of less than 90° with the one of the rotor and the stator, and fastening means for pressing the root region of each of the winding carriers into the angle (w) so that the winding carriers bear against the one of the rotor and the stator.

2. The electric motor as claimed in claim 1, wherein the winding of each of the winding carriers are in the same direction.

3. The electric motor as claimed in claim 1, wherein root region of adjacent winding carriers bear against one another.

4. The electric motor as claimed in claim 3, wherein the root region of each of the winding carriers are provided with slot means to accommodate the fastening means.

5. The electric motor as claimed in claim 1, wherein the fastening means is a screw bolt which engages a tapped hole in the plate.

6. The electric motor as claimed in claim 3, wherein the root region of adjacent winding carriers form a positive-locking connection with one another.

7. The electric motor as claimed in claim 6, wherein the positive-locking connection is a slot/key connection.

8. The electric motor as claimed in claim 3, wherein at least one bore passes through a root region of a winding carrier and a fastening means passes through the bore.

* * * * *